Aug. 24, 1937. H. I. LEWIS ET AL Re. 20,483

MULTIPLE SPINDLE DRILL

Original Filed Aug. 31, 1933 5 Sheets-Sheet 1

INVENTORS:
HARRY I. LEWIS
FREDERICK W. SEYBOLD
Kenis Hudson & Kent
ATTORNEYS

Aug. 24, 1937. H. I. LEWIS ET AL. Re. 20,483

MULTIPLE SPINDLE DRILL

Original Filed Aug. 31, 1933 5 Sheets-Sheet 2

INVENTORS:
HARRY I. LEWIS
FREDERICK W. SEYBOLD
Kerr Hudson & Kent
ATTORNEYS

Aug. 24, 1937. H. I. LEWIS ET AL Re. 20,483
MULTIPLE SPINDLE DRILL
Original Filed Aug. 31, 1933 5 Sheets-Sheet 3
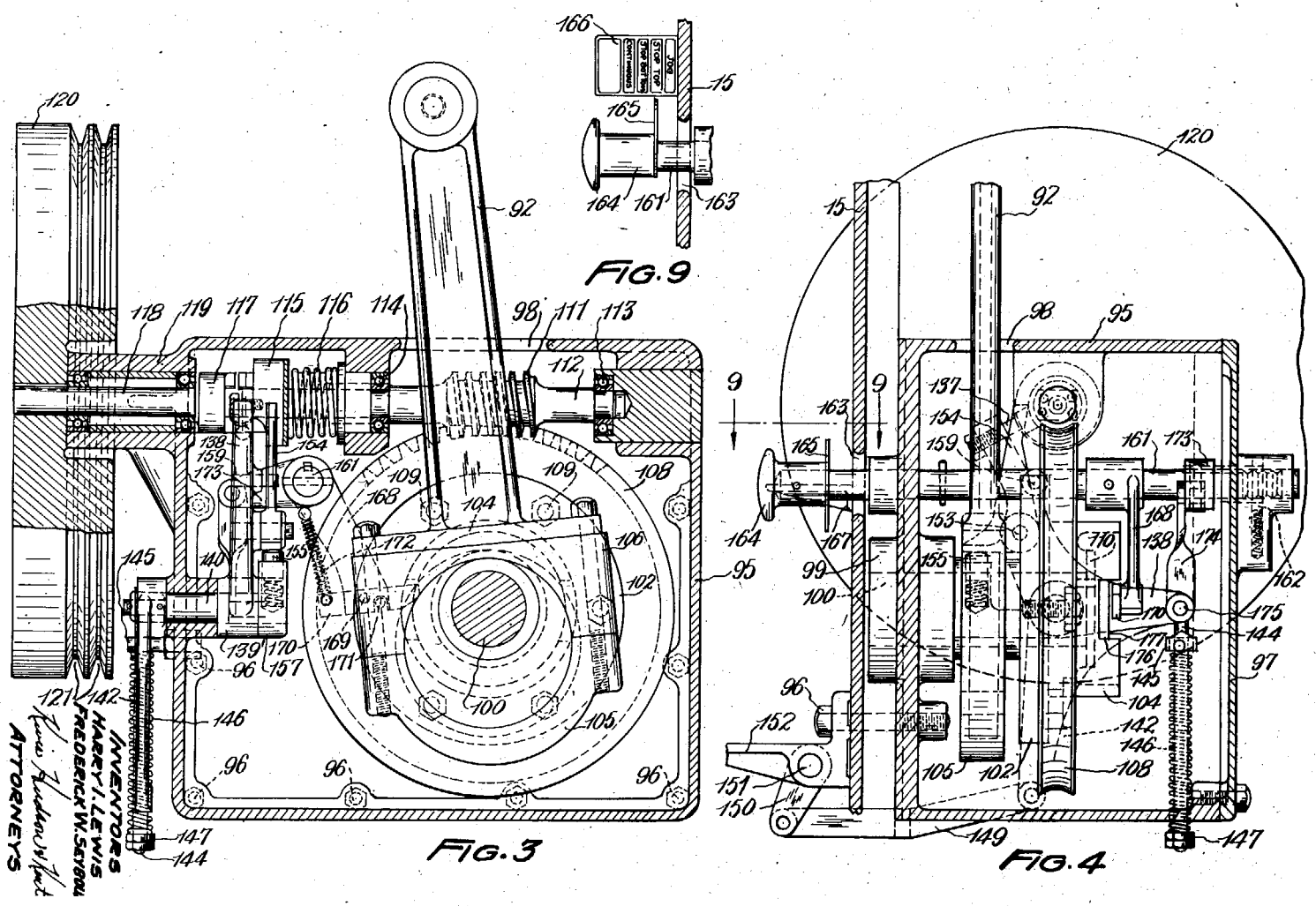
INVENTORS
HARRY I. LEWIS
FREDERICK W. SEYBOLD
Kerr Hudson & Kent
ATTORNEYS

MULTIPLE SPINDLE DRILL

Original Filed Aug. 31, 1933 5 Sheets-Sheet 4

INVENTORS
HARRY I. LEWIS
FREDERICK W. SEYBOLD
Kwis Hudson & Kent
ATTORNEYS

INVENTORS
HARRY I. LEWIS
FREDERICK W. SEYBOLD
Kerr Hudson & Kent
ATTORNEYS

Reissued Aug. 24, 1937

Re. 20,483

UNITED STATES PATENT OFFICE 20,483

MULTIPLE SPINDLE DRILL

Harry I. Lewis and Frederick W. Seybold, Westfield, N. J., assignors to Harris Seybold Potter Company, Cleveland, Ohio, a corporation of Delaware Original No. 2,044,709, dated June 16, 1936, Serial No. 687,586, August 31, 1933. Application for reissue February 16, 1937, Serial No. 126,062

28 Claims. (Cl. 164—86)

This invention relates to improvements in multiple spindle drills, particularly drilling machines for making perforations in paper sheets, such for instance as are employed as fillers in loose leaf books.

One of the objects of the invention is the provision of means for drilling a series of holes in a stack of paper sheets quickly and accurately.

Another object is the provision of means for disposing of the cuttings of a series of hollow drills in a simple and effective way, which means shall be unaffected by adjustment of the drill heads transversely of the machine for the purpose of regulating the spacing of the perforations.

Another object is the provision of control mechanism which in addition to providing automatic stopping at the end of the return stroke, permits automatic stopping at the end of the work stroke, that is at the point of greatest penetration of the drills, in order to facilitate depth adjustment of the individual drills.

Another object is the provision of means for varying the high point position of a rising and falling work table, for the purpose of providing depth adjustment of all drills simultaneously whereby sets of drills of different lengths may be employed.

Another object is the provision of a novel presser foot for gripping the work adjacent the point of application of the drill.

A further object is the provision of means for permitting the gauging of sheets close to the line of centers of the drills.

Still another object is the provision of effective means for lubricating the drill.

Other objects and features of novelty will appear as we proceed with the description of that embodiment of the invention which, for the purposes of the present application, we have illustrated in the accompanying drawings, in which Figure 1 is a front elevational view of the complete machine, certain parts being broken away and others shown in section in order to more fully illustrate the invention.

Fig. 3 is an elevational view, partly in transverse vertical section and on a larger scale, of the table raising and lowering mechanism.

Fig. 4 is a side elevational view of the same, also partly in vertical section.

Fig. 9 is a horizontal sectional detail view taken substantially on the line 9—9 of Fig. 4.

Figure 1:
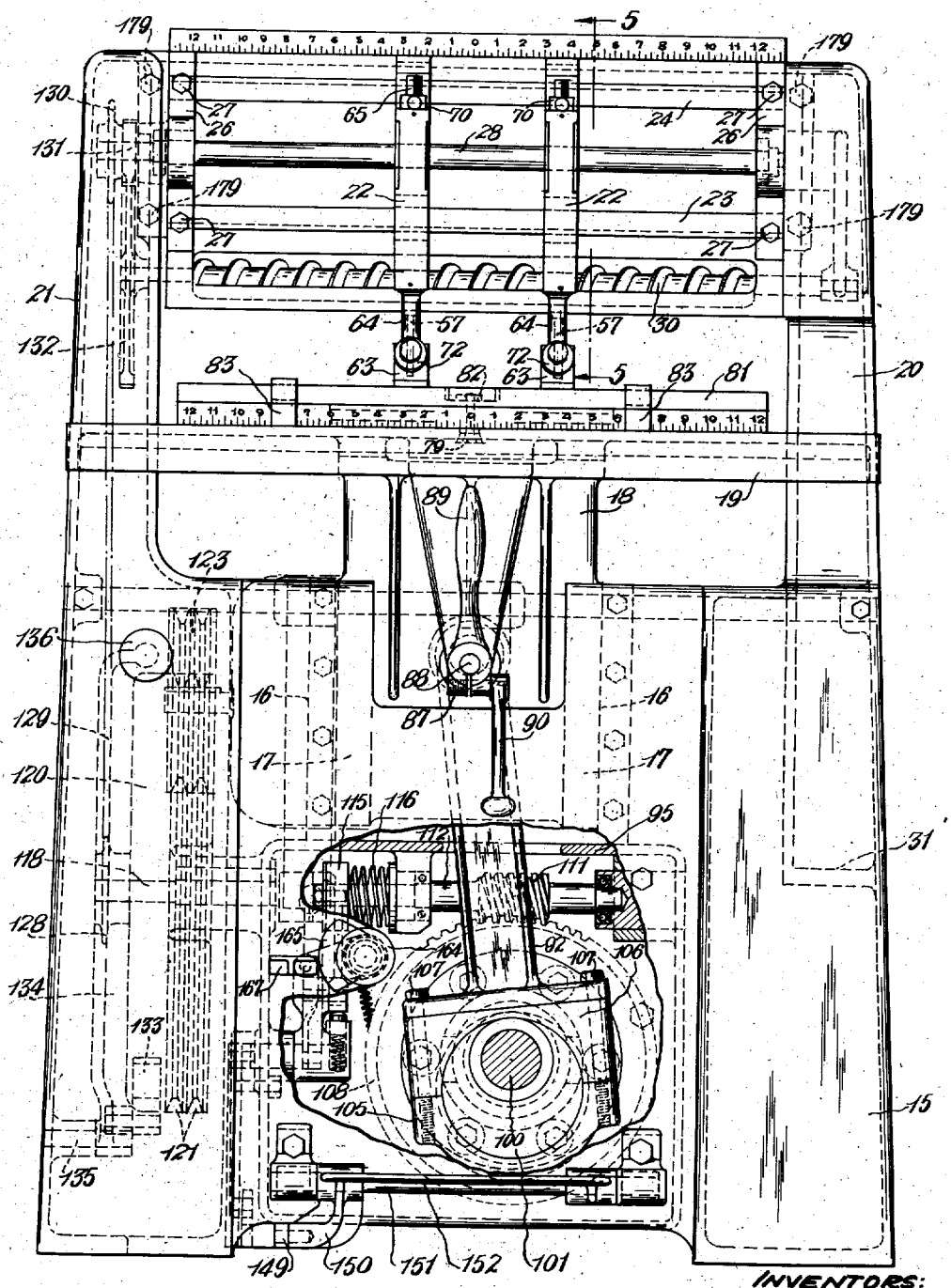

In the embodiment of the invention herein illustrated the hollow drills rotate without axial movement. The table upon which the work is positioned moves up to feed the work to the drills and then down again to permit the finished work to be removed and new work to be placed in position against the back and side gauges. The cuttings travel upwardly through the hollow drills and through passages in the spindles and in the drill heads into a transverse conveyor, in the present instance a screw conveyor, which is carried by the frame of the machine, and with which the head passages are always in communication regardless of the positions of adjustment of the heads. In the present embodiment the table has a fixed length of stroke up and down, but that stroke may be raised or lowered, thereby permitting the use of drills of different lengths. The up and down movement of the table is arranged to be stopped when a clutch is disengaged, and a control for the clutch may be set for automatic disengagement at the bottom of the table stroke, or for automatic disengagement both at the bottom and at the top of the stroke. The stopping of the table in the top position is for the purpose of enabling the operator to set the drills accurately in relation to the wooden drill strip in the table. The control also provides for continuous running, that is without disengagement of the clutch, and for "jogging", that is manual control by means of which the clutch may be thrown in or out at will so as to cause movement of the table up or down to any extent desired and to stop the movement at the desired position.

Referring now more particularly to the drawings, the frame or body of the machine is indicated by the reference numeral 15. In the body of the machine are provided vertical ways 16, within which slides 17 are adapted to move up and down. These slides are integral parts of a pedestal 18 upon which is carried the work table 19. The latter is illustrated in its lowermost position.

The upper part of the machine body is U-shaped, that is it comprises two hollow vertical side posts 20 and 21. Connecting the upper ends of these posts and rigidly attached to both of them is a cross rail 22, more or less rectangular in cross section, its cross sectional shape being illustrated in Fig. 5. This rail carries the adjustable drill heads and the conveyor for disposing of the drill cuttings. On its forward side it is provided with a wide dovetail 23, 24, the intermediate portion 25 between the two separated parts of this dovetail being curved rearwardly to accommodate the drill heads and their driving shaft, as will presently appear.

At the ends of the dovetail 23, 24 we mount two brackets 26 having dovetail portions which are formed to fit the dovetail 23, 24, these brackets being secured against movement upon the rail by screws 27 or the like. Each bracket carries a bearing for a shaft 28, through which power is furnished for the rotation of the drill spindles.

In the lower part of the rail 22 there is a conveyor comprising a lengthwise passage 29 which is open on the forward side of the rail throughout the length of the latter. A conveyor screw 30 may be positioned within this passage. A free exit for cuttings is provided between the hollow post 20 and the adjacent end of passage 29, so that the cuttings may drop down through the post onto an inclined surface 31 therein, by means of which the cuttings are directed rearwardly into any convenient receptacle, not shown.

Any desired number of drill heads 32 may be mounted upon the dovetail 23, 24. Each head has a dovetail form to engage the dovetail portion 23 of the rail, and at the top is provided with a wedge block 33 which engages behind the dovetail portion 24. The wedge carries a threaded post 34 which extends through a perforation in the head and has threadably mounted thereupon a thumb nut 35. When the head 32 is to be adjusted lengthwise of the rail 22, the thumb nut 35 is loosened, and when the desired adjustment has been made the nut is again tightened, thereby locking the head against movement. The wide dovetail insures accurate positioning of the various heads, as well as of the bearings for the shaft 28, and thereby maintains the shaft and drill heads in accurate position relative to each other.

Each head 32 is partly hollow and accommodates a spiral gear 36, which is free to slide upon the shaft 28 but is held against turning movement with respect thereto by a key 37 mounted in the gear and free to slide within a keyway 38 in the shaft. Plates 39, removably attached to the head, hold the gear 36 in proper position within the head.

In each head there is a vertical spindle 40 rotatably mounted in ball bearings 41 and 42 and in an oilless bushing 43. Upon this spindle there is a spiral gear 44 which meshes with gear 39, and which is slidably keyed to the spindle in order to permit vertical adjustment of the latter. Such vertical adjustment is accomplished by means disclosed in detail in Patent 1,554,060 to J. T. Wright. Briefly, this means consists of a nut 45 mounted upon a threaded portion of the spindle between two split collars 46 and 47, the collar 46 engaging an upper ball thrust bearing 48 and the lower collar 47 engaging a washer 49 which rests upon the lower end of a window 50 in the head. As the nut 45 is rotated in one direction or the other, being held by the collars and by the bearing 48 and washer 49 against vertical movement with respect to the head, it causes the spindle to move up or down in the head. The collars 46 and 47 are caused to rotate with the spindle by means of screws 51 and 52 set into the spindle, the heads of the screws extending into the spaces between the ends of the split collars. The nut 45 is cylindrical on its outer surface, and is provided with one or more vertical slots for the reception of a pin or pins 53 mounted in a knurled ring 54. One or more projections 55 at the lower edge of ring 54 are adapted to extend into sockets 56 in the upper edge of split collar 47. When an adjustment is to be made the operator raises ring 54 to disengage the projections and sockets 55 and 56, respectively, rotates the ring to impart rotation to the nut to the desired extent, and then permits the ring to descend again, causing the projections 55 to again enter the sockets 56, whereby the nut is locked against accidental movement. Quick adjustment of the spindle up or down to accomplish individual adjustment of the drills is thereby provided.

The lower end of each spindle has an enlarged part which extends through the bushing 43 and comprises a chuck for the reception of the hollow drill 57. This enlarged portion of the spindle is provided with a passage 58 communicating at the bottom with the bore of the hollow drill and deflected at the top and terminating there at a somewhat reduced portion of the spindle in a mouth 59 which opens into an annular chamber 60 in the head surrounding the spindle. Opposite the mouth 59 the spindle is provided with a wing 61 which sweeps through the chamber 60 and serves to expel any cuttings discharged from the mouth 59 into an inclined passage 62 formed in the head in communication with the chamber 60. The lower end of the passage 62 registers with the conveyor passage 29 in the rail 22. The hollow drill per se forms no part of the present invention but, as an example of a drill which may be employed for the purpose, reference may be had to Dom Patent 1,279,495, issued September 24, 1918.

Figure 5:
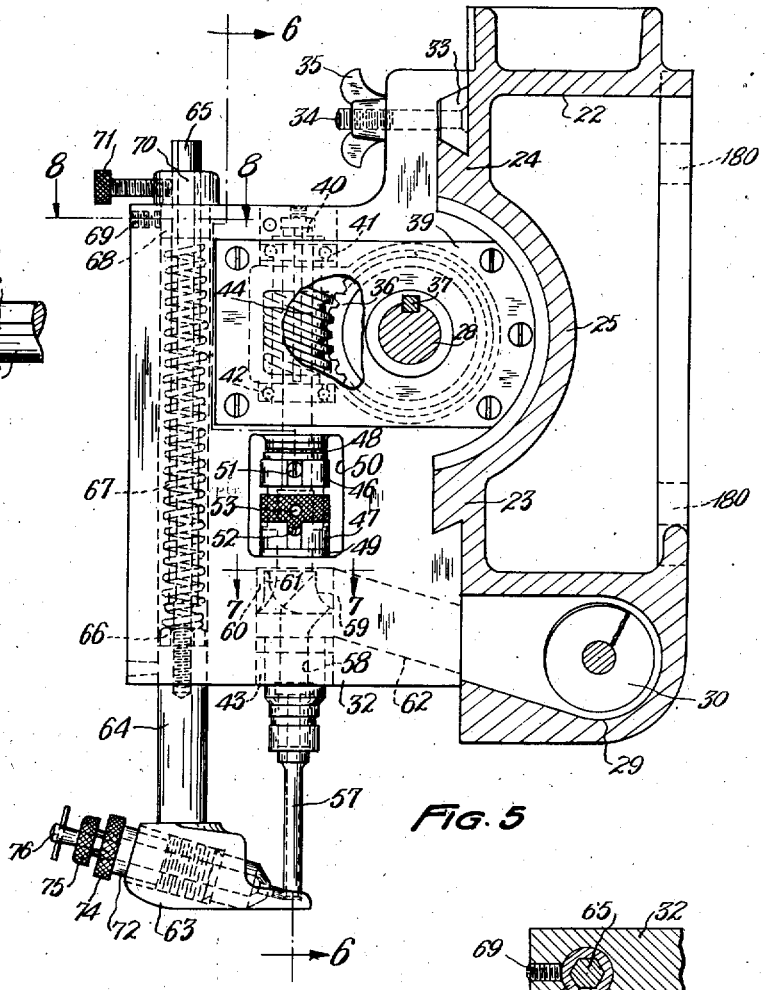
Fig. 5 is a detail sectional view taken substantially on the line 5—5 of Fig. 1, and showing one of the drill heads in elevation on a larger scale.
Figure 8:
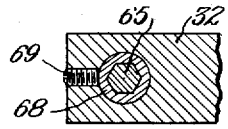
Fig. 8 is a detail horizontal sectional view taken substantially on the line 8—8 of Fig. 5.
Figure 7:
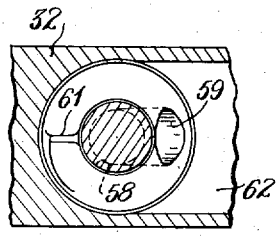
Fig. 7 is a horizontal sectional detail view of a portion of a spindle, the view being taken substantially on the line 7—7 of Fig. 5.
Figure 14:
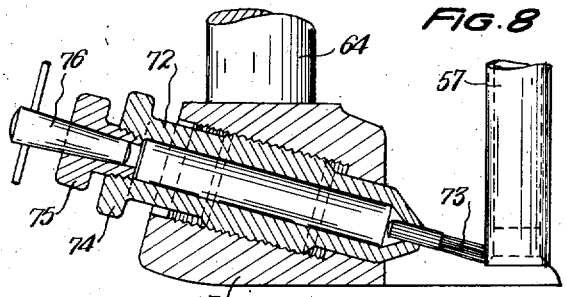
Fig. 14 is a large scale sectional view through the base of the clamping foot and the drill lubricator carried thereby.

A work clamping foot 63 is carried by each head, and preferably comprises a bifurcated end which straddles the drill 57. This head is attached to the lower extremity of a plunger 64, the lower part of which may be cylindrical as shown in Fig. 5. The upper portion of the plunger however is a hexagonal rod 65 which has its lower end turned down and threaded to fit within a threaded socket in the upper extremity of the cylindrical part 64. A nut 66 threaded onto the threaded portion of the hexagonal rod 65 may be turned down against a cylindrical portion 64 to lock the two plunger elements in desired relative adjustment. The plunger extends through a cylindrical bore in the head 32 of a size to slidably fit the cylindrical part 64 of the plunger. Around the hexagonal rod within this bore there is a spiral spring 67 which bears at its lower end against the nut 66 and at its upper end against a plug 68 mounted in the upper extremity of the bore and provided with a hexagonal opening which acts as a guide for the hexagonal part 65 of the plunger as it moves up and down. The plug 68 may be held against movement by a set screw 69. The plug 68 prevents the plunger from turning during the operation of the machine, but if any slight rotational adjustment of the plunger is desired it may be secured by loosening the screw 69, after which the plunger may be turned to the desired angle and the screw again tightened. 70 is a collar mounted upon the plunger above the head and held in any desired position by a set screw 71. This collar 70 acts as an adjustable stop to limit the downward movement of the plunger.

When the stop 70 is adjusted downwardly on the plunger the initial position of the presser foot 63 is raised, and at the same time the initial pressure of the spring 67 is increased, but with a given relative relation between the parts 64 and 65 of the plunger, and assuming that the spring 64 is always under more or less pressure, then the spring pressure exerted by the presser foot 63 upon the work pile varies directly with the distance between the presser foot 63 and the head 32, in other words it varies directly with the degree of penetration of the drill into the paper stock. The stock therefore is gripped most firmly at the end of the work stroke when the need for gripping is greatest, but in practice the adjustments are such that the paper is also gripped under a considerable pressure at the beginning of the work stroke.

We provide special means for applying lubrication to the exterior surface of the drill in order to facilitate its travel through the paper stock, but the lubricating liquid is of such a character and it is applied so sparingly as not to cause any discoloration of the paper around the perforation. To this end we provide a fountain brush which comprises a hollow metal container 72 with a brush tuft 73 at its lower extremity. This container is threadably mounted in the foot 63 and has a knurled head 74 by which it may be turned so as to position itself axially at such a point as to cause the brush to engage the side of the drill to such an extent as to feed the proper amount of lubricant onto the rotating surface of the drill. In the upper end of the container there is a filler plug 75 which is provided with a tapered central opening. A tapered plug 76 fits this opening. When the plug 76 is loosened or removed atmospheric pressure is free to assist gravity in producing a flow of lubricant through the brush 73 onto the drill. When the plug 76 is pushed tightly into its socket, however, air cannot enter the container and the flow of lubricant is interrupted.

In the top of the table 19 beneath the line of centers of the drills 57 there is a transverse groove 77 which receives a maple or other wooden strip 78 which acts as a drill block. In the upper surface of the table rearward of the strip 78 there is a dovetail groove 79 within which slides a dovetail block 80 constituting part of a back gauge, which also includes a gauge plate 81 extending across the table between the posts 20 and 21. The back gauge may be adjusted forward and backward to any desired position, and may be locked in such position by means of a hand nut 82 on the upper end of a clamping stud mounted in the dovetail block 80.

When drills of short length are employed the larger lower ends of the spindles may interfere with the plate 81 for a setting of the perforations close to the edges of the paper stock. In such cases we mount upon the gauge plate 81 a plurality of gauge strips 83 which have upper portions hooked over the plate 81 and which are secured in desired position by set screws 84. These gauge strips are mounted out of alignment with the drill spindles, and they permit the formation of perforations right up to the gauge line. The table is also provided with a side gauge 85, omitted from Fig. 1 for the sake of clearness. This gauge may be mounted or adjusted in any desired manner.

In the forward end of the table 19 there is a depending hanger 86 carrying a split bearing 87 within which is oscillatably mounted a shaft 88. A crank handle 89 is pinned to the forward end of this shaft. On the split bearing there is a screw clamp with a clamp handle 90. The shaft 88 extends through the pedestal 18 in which it has a bearing. On its rear end it carries an eccentric 91 which forms a pivotal bearing for the upper end of a connecting rod 92. A plate 93 secured to the eccentric by means of a screw 94 serves to maintain the eccentric and connecting rod in operative relation. The up and down movement of the connecting rod 92 imparts reciprocation to the table 19, moving in its ways 16. The axis of pivot 91, however, may be raised or lowered with respect to the table by the manipulation of the handle 89, thereby changing the upper and lower limits of the table stroke without changing the length of the stroke.

The mechanism for reciprocating the table and the control for that mechanism constitute a unit which is separable from the balance of the machine for facility in repair and replacement. This unit is mounted in a box 95 which may be secured to the forward transverse part of the frame by bolts 96. A cover 97 closes the rear of the box. In the top of the box there is an opening 98 through which the connecting rod 92 extends.

Figure 15:
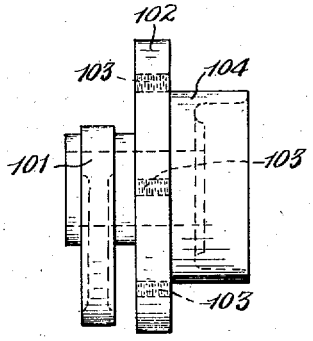
Fig. 15 is a detail elevational view of an eccentric driving element and other integral parts.

On the forward wall of the box 95 there is formed a forwardly and rearwardly extending boss 99 within which is supported a large pin or fixed shaft 100. Upon this pin there is rotatably mounted a casting illustrated in Fig. 15, which includes an eccentric 101, a concentric disc 102 with tapped holes 103 therein, and a drum 104. A pair of eccentric straps 105 and 106 embraces the eccentric 101. Studs 107 secure these eccentric straps together and to the lower end of connecting rod 92.

A worm wheel 108 surrounds the forward part of drum 104 and is secured to disc 102 by means of bolts or studs 109 extended through openings in the worm wheel into the tapped holes 103 of the disc. A plate 110 secured to the rear end of pin 100 serves to hold these rotating parts against axial movement.

Worm wheel 108 is driven by worm 111 on a shaft 112 which is mounted in ball bearings 113 and 114 carried by the box 95. Beyond the bearing 114 the shaft 112 is splined to slidably carry a jaw clutch member 115 which is normally urged toward the left, as viewed in Figs. 1 and 3, by a coil spring 116 surrounding the shaft and the hub of the clutch member. The jaws of this clutch member are adapted to engage with jaws of a clutch member 117 carried upon the end of a shaft 118 aligned with the shaft 112. This shaft 118 is mounted in ball bearings carried in an outwardly extending cylindrical boss 119 on the box 95. Beyond the boss 119 there is keyed to shaft 118 a fly-wheel 120 which overhangs the boss 119 to some extent and is provided with a pair of integral V-pulleys 121. V-belts 122 run from these pulleys over a pair of small pulleys 123 on the shaft of an electric motor 124, the base 125 of which is hung from a transverse rod 126 about which the base may pivot. Adjusting screws 127 are threaded through the lower end of the base 125 and bear against some fixed part of the machine frame or box 95. By this means the proper tension in the belts may be secured and maintained.

On the outer extremity of the shaft 118 we mount a sprocket wheel 128 which is connected by means of a chain 129 with a sprocket 130 on one extremity of shaft 28. Driving force from the latter shaft to the conveyor screw 30 is transmitted by a pinion 131 made integral with sprocket 130 and meshing with a gear 132 on the shaft of conveyor screw 30.

A brake shoe 133 is adapted to engage the periphery of fly-wheel 120 and is pivotally mounted upon the short end of a bell crank lever 134 which is pivoted at 135 in the frame of the machine. At its upper end it carries an operating handle 136 which projects through an opening in the machine frame. This braking means may be employed to stop the fly-wheel promptly after the motor switch has been opened.

Figure 2:
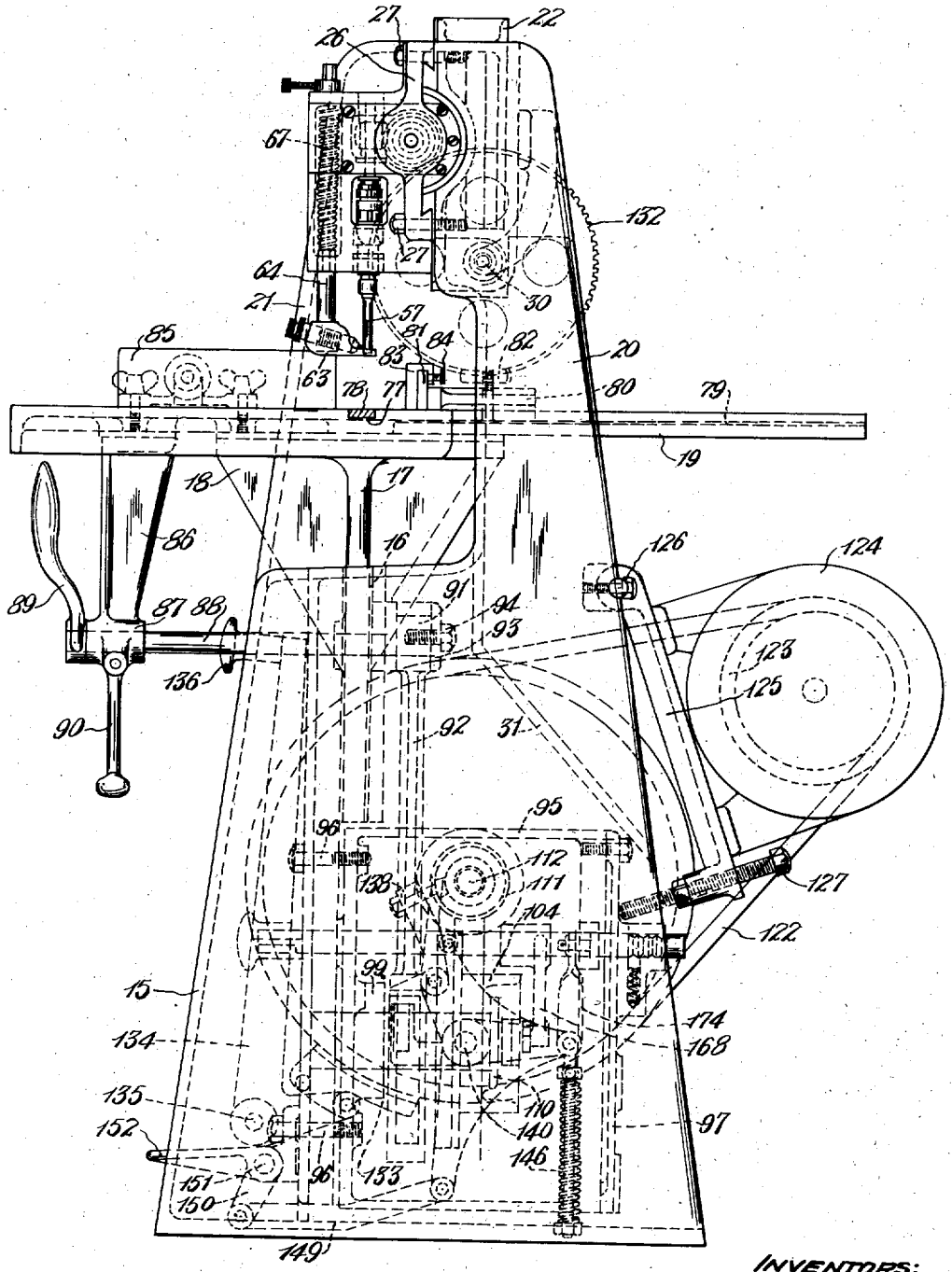
Fig. 2 is a side elevational view.
Figure 6:
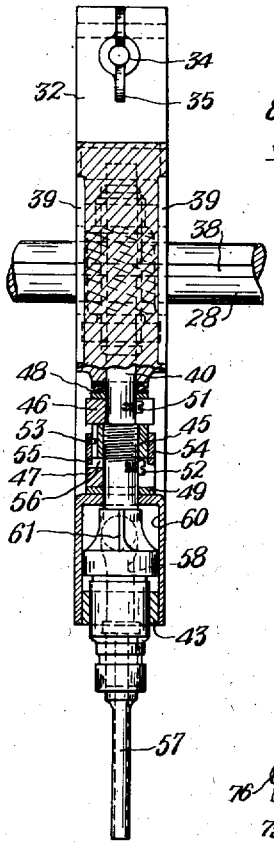
Fig. 6 is a sectional view taken substantially on the line 6—6 of Fig. 5 showing the drill spindle and accompanying parts.

The sliding clutch member 115 may be caused to move away from engagement with the clutch member 117 when a pin 137 on the upper end of a bell crank lever 138 is caused to drop into engagement with a cam groove formed in an enlargement of the clutch member. When this occurs the rotation of the clutch member with its cam face against pin 137 forces the clutch member to the right against the action of spring 116, disconnecting the clutch members and thereby interrupting the application of driving force to the table moving mechanism. Lever 138 is provided with a perforated hub 139' which is mounted upon a short shaft 140 that has bearing in a side wall of box 95. The lever 138 is secured against rotation upon the shaft by means of a set screw, not shown, threaded into the tapped hole 141. On the outer end of shaft 140 there is secured a bell crank lever 142. Pivotally connected at 143 to this lever is a rod 144 which runs through a perforated bracket 145 mounted on the box 95. Below this bracket a coil spring 146 surrounds the rod. This spring abuts against and is adjustably tensioned by a pair of nuts 147 threaded onto the lower end of the rod. The spring tends to rock the shaft 140 in a clockwise direction as viewed in Figs. 2 and 4. In order to rock the shaft 140 in an anti-clockwise direction we attach to the lower end of lever 142 at 148 a link 149 which extends through a suitable opening in the box 95 and is pivotally connected at its forward extremity to a crank 150. The latter is pinned to a shaft 151, and on this shaft there is also secured a pedal 152. When pressure is applied to the latter by the operator's foot, the shaft 140 is turned anti-clockwise against the action of spring 146.

Lever 138 has pivotally mounted thereon at 153 another bell crank lever 154, the lower arm of which bears against a spring pressed plunger 155 slidable in a socket 156 formed in a projecting arm 157 of the lever 138. The upper arm of lever 154 is formed to enter a notch 158 in the periphery of the clutch member 115. A pin 159 mounted in a socket 160 in lever 138 is adapted to engage the rear side of lever 154 and to retract that lever when the lever 138 is retracted.

When the clutch member 115 is moved out of clutching engagement, and the application of power to the table moving mechanism is thereby interrupted, the mechanism tends to stop, but there might be sufficient fly-wheel effect to rotate clutch member 115 far enough to permit pin 137 to descend again into engagement with the low part of the cam surface on the clutch member, thereby temporarily engaging the clutch members a second time. The lever 154 falling into socket 158 on the clutch member prevents such an occurrence. It also enables a stopping of the table at an absolutely accurate position, for instance at the very top of its stroke, which is of advantage in setting the drills for depth of cut.

In addition to the pedal means for manually withdrawing the clutch pin 137, I provide automatic means which will now be described. 161 is an oscillatable shaft which may be moved longitudinally. It has four different longitudinal positions, determined by a spring detent 162 adapted to take into any one of four different annular grooves in the shaft. The shaft extends out through an opening 163 in the forward wall of the machine frame and on its outer extremity carries a knob 164 to the rear face of which is secured a sector shaped plate 165. This plate serves as a pointer which is used in conjunction with a plate 166 (Fig. 9) on the top of a bracket 167 to indicate to the operator the longitudinal setting of the shaft 161.

A crank arm 168 is pinned to shaft 161. On it is pivoted at 169 a blade 170 which has a notch in its lower edge to receive a stop pin 171 carried by the arm 168. A tension spring 172 tends to hold the forward end of the plate 160 down. This loose mounting of the plate 170 upon the arm 168 prevents jamming and possible breakage of the parts.

On a splined rear portion of shaft 161 there is slidably mounted against relative rotation an arm 173, which at its outer extremity is pivotally connected with a link 174 that extends down to and is pivotally connected with lever 138 at the point 175 thereof. It will be evident therefore that if the arm 168 is swung clockwise in Fig. 3 the link 174 will be raised and the shaft 140 will be turned anti-clockwise, thereby withdrawing the clutch pin 137.

Figure 13:
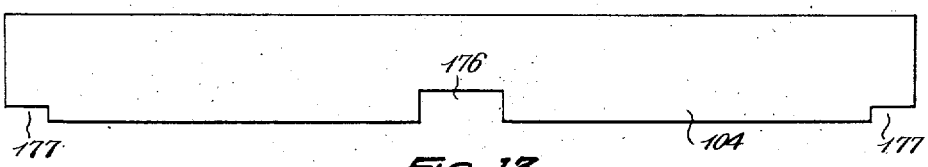
Fig. 13 is a development of the perimeter of a slotted drum employed in connection with the control for the table movement.
Figure 11:
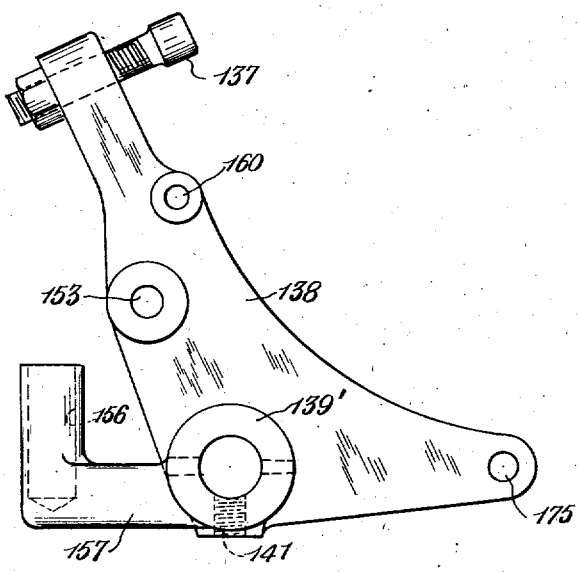
Figs. 11 and 12 are elevational detail views of two levers which may be employed in connection with the invention.
Figure 10:
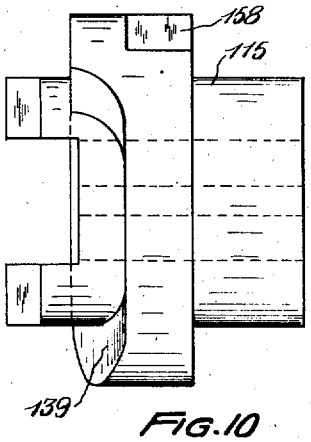
Fig. 10 is an elevational detail view of the sliding jaw clutch member.
Figure 12:
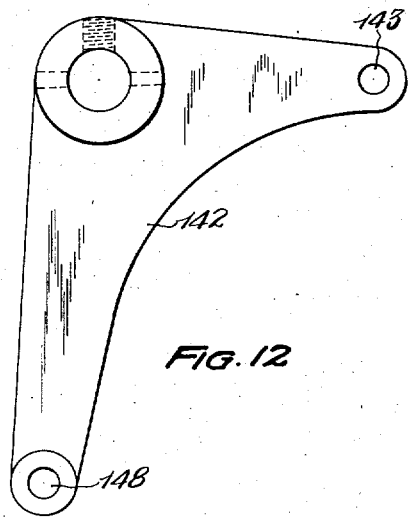

In the furthest forward position of shaft 161, marked "Continuous" on the plate 166 the blade 170 rides over the uninterrupted smooth periphery of drum 104, which corresponds with the upper portion of the development shown in Fig. 13. In the second position, marked "Stop bottom" on plate 166, the blade 170 rides upon the periphery of the drum until it encounters deep slot 176 in the drum, when the blade enters that slot enabling spring 146 to turn shaft 140 clockwise and disengage the clutch. The slot 176 is so positioned as to stop the table at the bottom of its stroke. In the third position of the shaft, marked "Stop top" on plate 166, the blade 170 can enter shallow slot 177 as well as deep slot 176. These slots being arranged 180° apart, the table stops at the bottom of its stroke and again, after the driving mechanism is released manually, at the top of its stroke, and so on. In the rearmost position of shaft 161, marked "Jog" on plate 166, the blade 170 is withdrawn from any contact with drum 104. The spring 146 is accordingly free to throw the pin 137 to clutch disengaging position, and it is held there except during such time as the operator keeps his foot on pedal 152. With this setting therefore it is possible for the operator to move the table to any desired point in its stroke by merely removing his foot from the pedal 152 when the table reaches such desired point.

The rail 22 with its accompanying parts may be withdrawn rearwardly after bolts 179 extended through openings 180 in the rail and threaded into tapped openings in the frame have been removed. When this is done the chain 129 is first disconnected. The rear sides of the posts 20 and 21 are open sufficiently to permit the protruding parts of the shaft 28 and screw conveyor 30, with their sprockets and gears, to be withdrawn.

*Operation.*—In the drawings two drill heads are illustrated. It is to be understood, however, that any number within the capacity of the machine may be employed. When the back and side gauges have been set for a given piece of work and the drill heads have been positioned, drills are mounted in the spindles. The operator then swings handle 90 to loosen split bearing 98, after which he moves handle 89 so as to lower the table with respect to the connecting rod 92. Next, he sets the knob 164 with the plate 165 opposite the notation "Stop top". He then starts the motor 124 and the table travels upwardly to the top of its stroke, and stops owing to the fact that the blade 170 drops into slot 177 in drum 104. The operator now manipulates handles 90 and 89 again to raise the table sufficiently to cause one or more of the drills to engage the wooden strip 78. Owing to the fact that the drills may not all be of identically the same length they may not all touch the strip 78, but the operator next proceeds to make them do so by manipulating the rings 54 of the individual spindles in the manner heretofore described, it being understood, of course, that the motor is stopped while such adjustment is being made.

Next the operator sets knob 164 with the plate 165 opposite the notation "Stop bottom". With the motor running, the operator will then touch the pedal 152 with his foot, thereby withdrawing blade 170 from slot 177 and permitting the clutch members to engage, whereupon the table will descend and the drum 104 will rotate sufficiently to permit blade 170 to enter slot 176, when the table will be at the bottom of its stroke. Everything is then in readiness for a regular run of work. The sheets are placed against the gauges, the operator touches the pedal 152, the table rises and feeds the work to the drills, and then recedes again, automatically stopping at the bottom of its stroke. The finished work is then removed and new work put in its place and the operation repeated.

In some cases it may be possible to remove finished work and put new work in its place without a stop at the bottom of the stroke, and in that event the shaft 161 will be set with the plate 165 opposite the notation "Continuous". The "jog" position of shaft 161 is not a running position, but is used frequently to move the mechanism through part of a stroke while the machine is being inspected or serviced.

Having thus described our invention, we claim:

1. In a machine of the class described, a frame, a rail mounted thereon, a drill head mounted upon and adjustable lengthwise of said rail, a spindle rotatably mounted in said head, a driving shaft extending through said head parallel to said rail, gearing between said shaft and spindle movable lengthwise of the shaft as the head is moved along the rail, and bearings for the ends of said shaft mounted upon said rail.

2. In a machine of the class described, a rail having a dovetail supporting portion, a drill head mounted upon and adjustable lengthwise of said dovetail supporting portion, a spindle rotatably mounted in said head, a driving shaft parallel to said rail extending through said head, gearing between said shaft and spindle movable lengthwise of the shaft as the head is moved along the supporting rail, and brackets carrying bearings for said shaft, said brackets being mounted upon said dovetail portions at the ends of the rail.

3. In a machine of the class described, a rail, a drill head mounted upon and adjustable lengthwise of said rail, a hollow drill rotatably carried by said head, a driving shaft extending through said head parallel to said rail, gearing between said shaft and said drill movable lengthwise of the shaft as the head is moved along the supporting rail, a conveyor carried by said rail extending lengthwise thereof, and means carried by said head for delivering cuttings from said drill into said conveyor.

4. In a machine of the class described, a rail, a drill head mounted upon and adjustable lengthwise of said rail, said rail having a lengthwise passage therein open on the side toward said adjustable head, a mechanical conveyor in said passage, a hollow drill rotatably mounted in said head, means for driving said drill, and means for delivering cuttings from said drill into said conveyor passage.

5. In a machine of the class described, a rail, a drill head mounted upon and adjustable lengthwise of said rail, said rail having a lengthwise passage therein open on the side toward said adjustable head, a spindle rotatably mounted in said head, a hollow drill mounted in said spindle, means for rotating said spindle, said head having an annular chamber surrounding the spindle and said spindle having a passage therethrough for receiving cuttings from said drill and delivering them into said annular chamber, and said head having an inclined passage connected with said chamber and registering with the open side of said rail passage.

6. In a machine of the class described, a rail, a drill head mounted upon and adjustable lengthwise of said rail, said rail having a lengthwise passage therein open on the side toward said adjustable head, a spindle rotatably mounted in said head, a hollow drill mounted in said spindle, means for rotating said drill, said head having an annular chamber surrounding the spindle and said spindle having a passage therethrough for receiving cuttings from said drill and delivering them into said annular chamber, said head having an inclined passage connected with said chamber and registering with the open side of said rail passage, and a sweeper blade on said spindle within said annular chamber for forcing cuttings into said inclined passage.

7. In a machine of the class described, a rail, a drill head mounted upon and adjustable lengthwise of said rail, a conveyor carried by said rail extending lengthwise thereof, and means for delivering cuttings from said drill head to said conveyor effective in all positions of the drill head.

8. In a machine of the class described, a rising and falling table, mechanism for causing said table to move up and down through a given stroke of predetermined length, said mechanism comprising a connecting rod, a pivot for one end of said connecting rod, and an eccentric mounting for said pivot by means of which its distance from said table may be varied.

9. In a machine of the class described, a rotating drill, means for feeding the drill and the work toward each other, and means fixed with respect to the work during the drilling operation for brushing liquid onto the side of the drill.

10. In a machine of the class described, a rotating drill, a presser foot adapted to engage the work adjacent the drill, means for feeding the drill and the work toward each other, and means carried by the presser foot for applying liquid to the side of said drill.

11. In a machine of the class described, a drill, a work table beneath the drill, mechanism for producing relative movement of the drill and table toward and away from each other in a recurring cycle, said mechanism comprising a crank and connecting rod, and control means settable to interrupt the said movement at the point of greatest separation, or to interrupt the movement both at the point of greatest separation and at the point of closest approach.

12. In a machine of the class described, a drill, a work table beneath the drill, mechanism for producing relative movement of the drill and table toward and away from each other, said mechanism comprising a crank and connecting rod, and control means settable to permit continuous operation of said mechanism, to interrupt the said movement at the point of greatest separation, to interrupt the movement both at the point of greatest separation and at the point of closest approach, or to interrupt the movement at any desired point.

13. In a machine of the class described, a pair of spaced posts, a rail mounted between said posts, a drill head adjustably mounted upon said rail, a spindle in said head, a shaft removably mounted in the rail extending through said drill head and operatively connected with said spindle, one end of said shaft having a driving element thereon, and means for removably securing said rail to said posts.

14. In a machine of the class described, a pair of spaced posts, a rail mounted between said posts, a drill head adjustably mounted upon said rail, a spindle in said head, a shaft removably mounted in the rail extending through said drill head and operatively connected with said spindle, a mechanical conveyor for cuttings mounted in said rail, means for operatively connecting said shaft and conveyor, a driving element attached to one of said last named elements, and means for removably securing said rail to said posts.

15. In a machine of the class described, a head having a vertical bore therethrough, a plunger extending through said bore, a presser foot on the lower end of the plunger, spring means within the head tending to depress said plunger, and an adjustable stop on the upper end of the plunger adapted to engage said head to limit the downward movement of the plunger.

16. In a machine of the class described, a head having a vertical bore therethrough, a plunger extending through said bore, a presser foot on the lower end of the plunger, spring means within the head tending to depress said plunger, means carried by the plunger for varying the tension of the spring means, and an adjustable stop on the upper end of the plunger adapted to engage said head to limit the downward movement of the plunger and to permit downward movement thereof to a sufficient extent to expose said tension varying means.

17. In a machine of the class described, a head having a vertical bore therethrough, a plunger extending through said bore, said plunger being formed in two separable parts with the joint therebetween normally positioned within said bore, a presser foot on the lower end of the plunger, spring means within the head tending to depress said plunger, and an adjustable stop on the upper end of the plunger adapted to engage said head to limit the downward movement of the plunger and to permit downward movement thereof to an extent sufficient to expose said joint, whereby the plunger may be disassembled and removed from the bore.

18. In a machine of the class described, a head having a vertical bore therethrough, a plunger extending through said bore, the upper portion of said plunger having a non-circular cross section, a collar having an opening therethrough shaped to slidably fit the non-circular portion of the plunger, said collar having a circular outer surface fitting within said bore and rotatable therein, and means for holding the collar in any one of a plurality of different angular positions, whereby the angular arrangement of the plunger may be adjusted.

19. In a machine of the class described, a rotating drill, a presser foot adapted to engage the work adjacent the drill, means for feeding the drill and the work toward each other, and a fountain brush carried by the presser foot in position to engage the side of the drill and to brush liquid thereonto.

20. In a machine of the class described, a drill, a work table beneath the drill, a crank and connecting rod for producing a cycle of relative movements of the drill and table from a point of greatest separation to a point of closest approach and back again to said point of greatest separation, and control means settable in advance for automatically interrupting said cycle at the point of closest approach.

21. In a machine of the class described, a drill, means for adjusting the drill longitudinally, a work table beneath the drill, a crank and connecting rod for producing a cycle of relative movements of the drill and table from a point of greatest separation through a stroke of fixed length to a point of closest approach, and back again to said point of greatest separation, and control means settable in advance for automatically interrupting said cycle at the point of closest approach.

22. In a machine of the class described, a drill, a work table beneath the drill, means for vertically reciprocating one of said elements through a stroke of fixed length, adjusting means for raising or lowering the stroke of the moving element without affecting the length of said stroke, and means settable in advance for interrupting the said reciprocation at that end of the stroke in which the said elements approach each other.

23. In a machine of the class described, a drill, a work table beneath the drill, means for vertically reciprocating one of said elements through a stroke of given length, said means being normally interrupted automatically at the point of greatest separation of said elements only, and means actuatable during the operation of the machine for automatically interrupting the said reciprocation when said movable element next arrives at the point of closest approach.

24. A paper drilling unit, comprising a paper drill hollow throughout its length to permit passage of cuttings therethrough, a rotatable chuck adapted to operatively engage the drill, an airtight housing embracing said chuck and provided with an outlet, said chuck having an opening through its body, one end of the opening being in open communication with one of the hollow ends of the drill and the opposite end being in open communication with the interior of said housing, a horizontally disposed fan blade secured to said chuck adapted to agitate said cuttings and to discharge the same through the outlet of said housing by an air current generated by the rotation of said fan blade.

25. In a machine of the class described, a spindle, a chuck carried thereby, a hollow drill mounted in said chuck, means for rotating said spindle, a fixed casing surrounding said chuck and having a discharge opening for cuttings, said chuck having a passage therethrough connecting the bore of the drill with the interior of said casing, and said chuck carrying a sweeper blade rotatable within the casing and effective for forcing through said discharge opening cuttings delivered from the drill into the casing.

26. In a machine of the class described, a spindle, a fixed casing through which said spindle projects, said spindle carrying a chuck within the casing, the chuck having a cylindrical portion closely fitting the internal wall of the casing, a hollow drill mounted in the chuck and extending downwardly through the casing, means for rotating the spindle, said chuck having a passage therethrough connecting the bore of the drill with the interior of the casing above said cylindrical portion, said chuck having a laterally extending wing within the casing above said cylindrical portion, said casing having an opening through which cuttings may be forced by the action of said rotating wing.

27. In a machine of the class described, a paper drill hollow throughout its length to permit passage of cuttings therethrough, a rotatable chuck operatively engaging the drill, a housing surrounding said chuck, said housing being closed at its upper end except for an opening accommodating the spindle, the housing and chuck being formed to provide a substantially annular chamber around the chuck, said housing having an outlet opening communicating with said annular chamber, the chuck and casing having a close fit at the bottom of said chamber to close the latter, said chuck having a passage through its body, one end of the passage being in open communication with the upper end of the hollow drill and the opposite end of the passage being in open communication with said annular chamber, and a horizontally disposed blade or wing carried by said chuck and extending into said annular chamber adapted to agitate said cuttings and discharge the same through said outlet opening.

28. In a machine of the class described, a hollow drill, a rotatable chuck operatively engaging the drill, a fixed casing surrounding said chuck and having a discharge opening for cuttings, said chuck having a passage therethrough the lower end of which communicates with the bore of the drill and the upper end of which opens into the casing, and said chuck carrying a blade or wing at a point diametrically opposite the upper end of said passage rotatable within the casing and acting to force through said discharge opening cuttings delivered into the said casing by said passage.

HARRY I. LEWIS.
FREDERICK W. SEYBOLD.